United States Patent
Bosshart et al.

(10) Patent No.: US 10,268,634 B1
(45) Date of Patent: *Apr. 23, 2019

(54) PROXY HASH TABLE

(71) Applicant: Barefoot Networks, Inc., Palo Alto, CA (US)

(72) Inventors: Patrick Bosshart, Plano, TX (US); Changhoon Kim, Palo Alto, CA (US)

(73) Assignee: BAREFOOT NETWORKS, INC., Santa Clara, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 15/365,887

(22) Filed: Nov. 30, 2016

Related U.S. Application Data

(63) Continuation of application No. 14/507,811, filed on Oct. 6, 2014, now Pat. No. 9,529,531.

(51) Int. Cl.
*G06F 3/06* (2006.01)
*G06F 16/22* (2019.01)
*G06F 12/00* (2006.01)

(52) U.S. Cl.
CPC ........ *G06F 16/2255* (2019.01); *G06F 3/0604* (2013.01); *G06F 3/064* (2013.01)

(58) Field of Classification Search
None
See application file for complete search history.

(56) References Cited

U.S. PATENT DOCUMENTS 5,757,795 A    5/1998   Schnell
6,625,612 B1*   9/2003   Tal .................... G06F 17/30949

(Continued)

OTHER PUBLICATIONS

Alizadeh, Mohammad, et al., "CONGA: Distributed Congestion-Aware Load Balancing for Datacenters," SIGCOMM'14, Aug. 17-22, 2014, 12 pages, ACM, Chicago, IL, USA.

(Continued)

*Primary Examiner* — Daniel D Tsui
(74) *Attorney, Agent, or Firm* — Adeli LLP

(57) ABSTRACT

Some embodiments of the invention provide novel methods for storing data in a hash-addressed memory and retrieving stored data from the hash-addressed memory. In some embodiments, the method receives a search key and a data tuple. The method then uses a first hash function to generate a first hash value from the search key, and then uses this first hash value to identify an address in the hash-addressed memory. The method also uses a second hash function to generate a second hash value, and then stores this second hash value along with the data tuple in the memory at the address specified by the first hash value. To retrieve data from the hash-addressed memory, the method of some embodiments receives a search key. The method then uses the first hash function to generate a first hash value from the search key, and then uses this first hash value to identify an address in the hash-addressed memory. At the identified address, the hash-addressed memory stores a second hash value and a data tuple. The method retrieves a second hash value from the memory at the identified address, and compares this second hash value with a third hash value that the method generates from the search key by using the second hash function. When the second and third hash values match, the method retrieves the data tuple that the memory stores at the identified address.

12 Claims, 9 Drawing Sheets

(56) References Cited

U.S. PATENT DOCUMENTS

| | | |
|---|---|---|
| 6,754,662 B1 | 6/2004 | Li |
| 9,529,531 B2 | 12/2016 | Bosshart et al. |
| 9,565,114 B1 | 2/2017 | Kabbani et al. |
| 9,571,400 B1 | 2/2017 | Mandal et al. |
| 9,608,913 B1 | 3/2017 | Kabbani et al. |
| 9,712,439 B2 | 7/2017 | Bosshart et al. |
| 9,876,719 B2 | 1/2018 | Revah et al. |
| 10,063,479 B2 | 8/2018 | Kim et al. |
| 2003/0126233 A1 | 7/2003 | Bryers et al. |
| 2005/0013280 A1 | 1/2005 | Buddhikot et al. |
| 2006/0112237 A1 | 5/2006 | Chen et al. |
| 2006/0245361 A1 | 11/2006 | Cheethirala et al. |
| 2009/0041017 A1 | 2/2009 | Luk |
| 2012/0136889 A1 | 5/2012 | Jagannathan et al. |
| 2013/0297798 A1 | 11/2013 | Arisoylu et al. |
| 2014/0241362 A1 | 8/2014 | Bosshart et al. |
| 2014/0244966 A1 | 8/2014 | Bosshart et al. |
| 2014/0328180 A1 | 11/2014 | Kim et al. |
| 2014/0334489 A1 | 11/2014 | Bosshart et al. |
| 2014/0372388 A1 | 12/2014 | Attaluri et al. |
| 2014/0372616 A1 | 12/2014 | Arisoylu et al. |
| 2014/0376555 A1 | 12/2014 | Choi et al. |
| 2015/0039823 A1 | 2/2015 | Chen |
| 2016/0098198 A1 | 4/2016 | Bosshart et al. |
| 2016/0099872 A1 | 4/2016 | Kim et al. |
| 2017/0289034 A1 | 10/2017 | Bosshart et al. |
| 2018/0337860 A1 | 11/2018 | Kim et al. |

OTHER PUBLICATIONS

Eisenbud, Daniel E., et al., "Maglev: A Fast and Reliable Software Network Load Balancer," 13th USENIX Symposium on Networked Systems Design and Implementation 16, 2016, 13 pages, USENIX Association, Santa Clara, CA, USA.

Gandhi, Rohan, et al., "Duet: Cloud Scale Load Balancing with Hardware and Software," SIGCOMM'14, Aug. 17-22, 2014, 12 pages, ACM, Chicago, IL, USA.

Gandhi, Rohan, et al., "Rubik: Unlocking the Power of Locality and End-point Flexibility in Cloud Scale Load Balancing," Proceedings of the 2015 USENIX Annual Technical Conference, Jul. 8-10, 2015, 13 pages, USENIX Association, Santa Clara, CA, USA.

Handigol, Nikhil, et al., "Plug-n-Serve: Load-Balancing Web Traffic using OpenFlow," ACM SIGCOMM 2009 Demo, Aug. 2009, 2 pages, Barcelona, Spain.

Kang, Nanxi, et al., "Efficient Traffic Splitting on Commodity Switches," CoNEXT'15, Dec. 1-4, 2015, 13 pages, ACM, Heidelberg, Germany.

Patel, Parveen, et al., "Ananta: Cloud Scale Load Balancing," SIGCOMM'13, Aug. 12-16, 2013, 12 pages, ACM, Hong Kong, China.

Wang, Richard, et al., "OpenFlow-Based Server Load Balancing Gone Wild," Hot-ICE'11 Proceedings of the 11th USENIX conference on Hot Topics in Management of Internet, Cloud, and Enterprise Networks and Services, Mar. 29, 2011, 6 pages, USENIX, Boston, MA, USA.

Non-Published commonly owned U.S. Appl. 15/600,752, filed May 21, 2017, 30 pages, Barefoot Networks, Inc.

Fan, Bin, et al., "Cuckoo Filter: Practically Better Than Bloom," CoNEXT'14, Dec. 2-5, 2014, 13 pages, ACM, Sydney, Australia.

Fan, Bin, et al., "MemC3: Compact and Concurrent Memcache with Dumber Caching and Smarter Hashing," NSID'13, 10th USENIX Symposium on Networked Systems Design and Implementation, Apr. 2003, 14 pages, Lombard, IL, USA.

Fan, Bin, et al., "Small Cache, Big Effect: Provable Load Balancing for Randomly Partitioned Cluster Services," SOCC'11, 2nd ACM Symposium on Cloud computing, Oct. 27-28, 2011, 12 pages, ACM, Cascais, Portugal.

Fan, Bin, et al., "When Cycles are Cheap, Some Tables Can Be Huge," HotOS XIV, May 2013, 6 pages.

Kalia, Anuj, et al., "Using RDMA Efficiently for Key-Value Services," SIGCOMM'14, Aug 17-22, 2014, 15 pages, ACM, Chicago, IL, USA.

Li, Xiaozhou, et al., "Algorithmic Improvements for Fast Concurrent Cuckoo Hashing," EuroSys'14, Apr. 13-16, 2014, 14 pages, ACM, Amsterdam, Netherlands.

Lim, Hyeontaek, et al., "MICA: A Holistic Approach to Fast In-Memory Key-Value Storage," NSDI'14, 11th USENIX Symposium on Networked Systems Design and Implementation, Apr. 2-4, 2014, 17 pages, USENIX Association, Seattle, WA,USA.

Lim, Hyeontaek, et al., "Practical Batch-Updatable External Hashing with Sorting," Meeting on Algorithm Engineering and Experiments (ALENEX), Jan. 2013, 10 pages.

Lim, Hyeontaek, et al., "SILT: A Memory-Efficient, High-Performance Key-Value Store," SOSP'11, 23rd ACM Symposium on Operating Systems Principles, Oct. 23-26, 2011, 13 pages, ACM, Cascais, Portugal.

Lloyd, Wyatt, et al., "Don't settle for Eventual: Scalable Causal Consistency for Wide-Area Storage with COPS," SOSP'11, 23rd ACM Symposium on Operating Systems Principles, Oct. 23-26, 2011, 16 pages, ACM, Cascais, Portugal.

Moraru, Iulian, et al., "Exact Pattern Matching with Feed-Forward Bloom Filters," ACM Journal of Experimental Algorithmics, May 2011, 19 pages, vol. 16, No. 16, Article 2.1, ACM.

Moraru, Iulian, et al., "Fast Cache for Your Text: Accelerating Exact Pattern Matching with Feed-Forward Bloom Fiters," Sep. 2009, 26 pages, School of computer Science, Carnegie Mellon University, Pittsburgh, PA, USA.

Phanishayee, Amar, et al., "Flex-KV: Enabling High-performance and Flexible KV Systems," MBDS'12, Workshop on Management of Big Data Systems, Sep. 21, 2012, 6 pages, ACM, San Jose, CA, USA.

Snoeren, Alex C., et al., "Fine-Grained Failover Using Connection Migration," 3rd USENIX Symposium on Internet Technologies and Systems, Mar. 26-28, 2001, 12 pages, USENIX Association, San Francisco, CA.

Vasudevan, Vijay, et al., "Using Vector Interfaces to Deliver Millions of IOPS from a Networked Key-value Storage Server," SOCC'12, 3rd ACM Symposium on Cloud Computing, Oct. 14-17, 2012, 13 pages, ACM, San Jose, CA USA.

Zhou, Dong, et al., "Scalable, High Performance Ethernet Forwarding with CuckooSwitch," CoNEXT, 9th International Conference on emerging Networking Experiments and Technologies, Dec. 9-12, 2013, 12 pages, ACM, Santa Barbara, CA, USA.

\* cited by examiner

PROXY HASH TABLE

CLAIM OF BENEFIT TO PRIOR APPLICATIONS

This Application is a continuation application of U.S. patent application Ser. No. 14/507,811, filed Oct. 6, 2014, now published as U.S. Patent Publication 2016/0098198. U.S. Patent Publication 2016/0098198 is incorporated herein by reference.

BACKGROUND

Load balancers are commonly used to spread the traffic load for a service to a number of computing devices that are available to provide the service. Since load balancers often serve as gathering points for the data traffic, there is a constant need to increase the speed of their operations. Also, load balancers need to dynamically react quickly to changes to the available pool of computing devices that can provide the load-balanced service. Ideally, this rapid and dynamic reaction should not come at the expense of inefficient consumption of hardware and software resources.

SUMMARY

Some embodiments of the invention provide novel methods for storing data in a hash-addressed memory and retrieving stored data from the hash-addressed memory. In some embodiments, a data storage method receives a search key and a data tuple. The method then uses a first hash function to generate a first hash value from the search key, and then uses this first hash value to identify an address in the hash-addressed memory. The method also uses a second hash function to generate a second hash value, and then stores this second hash value along with the data tuple in the memory at the address specified by the first hash value.

To retrieve data from this hash-addressed memory, a data retrieval method of some embodiments receives a search key. The method then uses the first hash function to generate a first hash value from the search key, and then uses this first hash value to identify an address in the hash-addressed memory. At the identified address, the hash-addressed memory stores a second hash value and a data tuple. The method retrieves the second hash value from the memory at the identified address, and compares this second hash value with a third hash value that the method generates from the search key by using the second hash function. When the second and third hash values match, the method outputs the data tuple that the memory stores at the identified address.

In the hash-addressed memory, the stored hash value serves as a proxy replacement for the search key. As a hash value can be smaller than its associated search key, storing the hash value in place of the search key can greatly reduce the size of each record in the hash-addressed memory. In turn, this allows more records to be stored in the hash-addressed memory. However, the reduction in the record size may come at the expense of hash collisions. Specifically, in some embodiments, a hash function can produce the same hash value for two different search keys. Accordingly, in some embodiments, the above-described data retrieval method in some cases might result in two different search keys retrieving the same data tuple from one addressed location in the memory. Because of this, the data retrieval method of some embodiments has to supply its data to a data computing node that can tolerate hash collisions.

In some embodiments, the hash-collision tolerant node is a load balancer that distributes a data message that is addressed to any one of several destination compute nodes, to one of those nodes based on the data tuple that is retrieved from the hash-addressed memory. For example, in some embodiments, the load balancer distributes data packets that are addressed to a virtual address that is associated with a group of destination compute nodes (e.g., a group of webservers, application servers, or database servers), to different network addresses of the different destination nodes.

In some embodiments, the virtual address for the group of data compute nodes (DCNs) is a virtual IP (VIP) address, while the network addresses of the DCNs are destination IP (DIP) addresses. Accordingly, in some embodiments, the load balancer distributes data packets that are addressed to a VIP address that is associated with a group of destination compute nodes (e.g., a group of webservers, application servers, or database servers), to different destination IP addresses (DIPs) of the different destination nodes. In some of these embodiments, the load balancer uses a hash of the five-tuple header values (i.e., the source IP address, destination IP address, source port, destination port, and protocol) of a data packet as the search key to retrieve from the hash-addressed memory a data tuple, which, in turn, allows the load balancer to identify a DIP for the data packet.

Load balancing in some embodiments inherently involves spreading the data messages based on a set of heuristic computations that are meant to evenly spread traffic amongst a number of candidate destination compute nodes. Accordingly, the load balancer's operations are not that negatively affected by two different five tuple values hashing to the same hash value, and retrieving the same data tuple from the hash-addressed memory, as such a collision can be viewed as being part of the heuristic computation set of the load balancer.

In different embodiments, the load balancers retrieve different types of data tuples from the hash-addressed memory. In some embodiments, the retrieved data tuples are DIPs to which the VIPs map. In other embodiments, the retrieved data tuples identify different storage structures (e.g., different tables) from which the load balancer has to retrieve the DIPs for the VIPs. For instance, in some embodiments, the retrieved data tuples are version numbers that identify different destination network address translation (DNAT) tables from which the load balancer should retrieve the DIPs for the VIPs specified in the received data packets.

Each time a DCN is added (e.g., instantiated or allocated) to the group, and its DIP should be used, the load balancer of some embodiments creates a new DNAT table to store all the available DIPs for the new flows that it receives. Also, in some embodiments, each time a DCN is removed (e.g., fails or is shut off) from the group, and its DIP should no longer be used, the load balancer of some embodiments creates a new DNAT table to store the available DIPs for the new flows that it receives. Other embodiments do not create a new DNAT table when a DCN is removed from the group of DCNs. For instance, in some embodiments, each DNAT table is a resilient table that upon removal of one of the DIPs that is identified by its records, directs packet flows that map to the removed DIP to one of the live DIPs that is identified by another one of its records. In some embodiments, each DNAT table stores a pseudo-random distribution of the DIPs that were available at the time of the creation of the DNAT table. A pseudo-random distribution of DIPs in a DNAT table in some embodiments entails distributing the DIPs that are available at the time of the creation of the DNAT table across the table's addressable locations.

Even after a new DNAT table version is created, the load balancer continues to process all prior flows that do not go to a removed DCN, by using one of the previously created DNAT tables that it was previously using to load balance the flows. In other words, some embodiments create a new version of the DNAT table each time a DCN is added or removed in order to allow newly received flows to use the new DNAT table, while allowing the older flows that are being processed to use prior DNAT table versions so long as these older flows are not being directed to the removed DCN. Older flows that were being directed to the removed DCN will have to be spread to other DCNs.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide novel methods for storing data in a hash-addressed memory and retrieving stored data from the hash-addressed memory. In some embodiments, a data storage method receives a search key and a data tuple. The method then uses a first hash function to generate a first hash value from the search key, and then uses this first hash value to identify an address in the hash-addressed memory. The method also uses a second hash function to generate a second hash value, and then stores this second hash value along with the data tuple in the memory at the address specified by the first hash value.

To retrieve data from the hash-addressed memory, a data retrieval method of some embodiments receives a search key. The method then uses the first hash function to generate a first hash value from the search key, and then uses this first hash value to identify an address in the hash-addressed memory. At the identified address, the hash-addressed memory stores a second hash value and a data tuple. The method retrieves the second hash value from the memory at the identified address, and compares this second hash value with a third hash value that the method generates from the search key by using the second hash function. When the second and third hash values match, the method outputs the data tuple that the memory stores at the identified address.

Given that the hash-addressed memory stores a hash of the search key instead of the search key, the hash-addressed memory is referred to below as a proxy hash table or a proxy key table. In this memory, the hash value serves as a proxy replacement for the search key. As a hash value can be smaller than its associated search key, storing the hash value in place of the search key can greatly reduce the size of each record in the hash-addressed memory. In turn, this allows more records to be stored in the hash-addressed memory.

Figure 1:
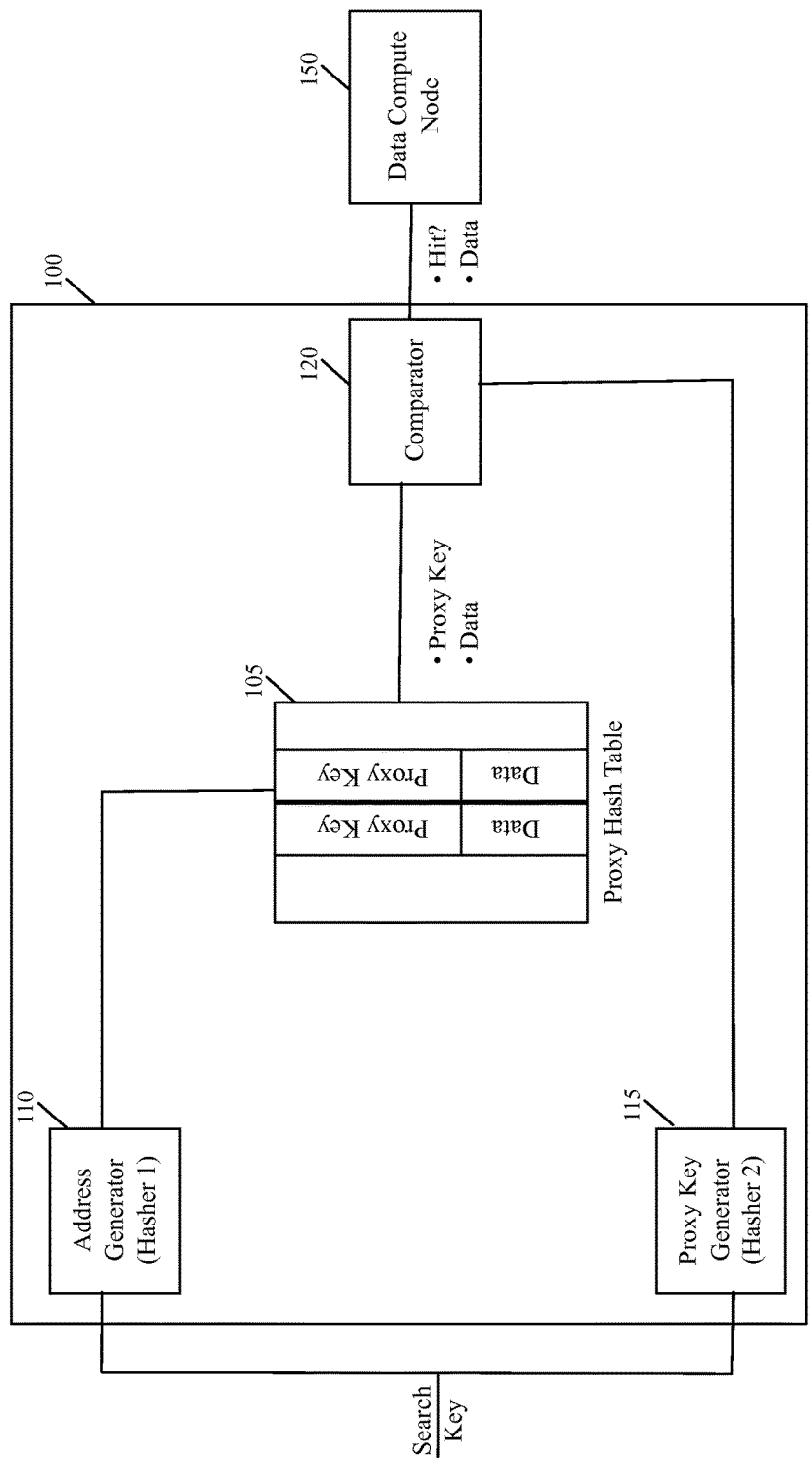
FIG. 1 illustrates a data storage that uses the proxy hash table of some embodiments.

FIG. 1 illustrates a data storage 100 that uses the proxy hash table of some embodiments. The data storage 100 stores a number of data tuples for a number of search keys. When this storage receives a search key from a data compute node 150 (e.g., device, application, service, etc.), the data storage determines whether it stores a data tuple for the search key, and if so, it provides this data tuple to the data compute node 150. As shown, this data storage 100 includes two hash generators 110 and 115, a proxy hash table 105, and a comparator 120.

The two hash generators 110 and 115 receive the search key from the data compute node 150 through an input/output interface (not shown). The hash generator 110 is an address generator that generates an address in the proxy hash table 105. Accordingly, when this address generator 110 receives the search key, it applies a first hash function to the search key to produce a first hash value that specifies an address in the proxy hash table 105. The address generator 110 outputs this hash value to the proxy hash table 105.

At each of several address locations in the proxy hash table 105, this table 105 stores a proxy key and a data tuple. Each proxy key is a hash value of a search key that the data storage 100 may receive. This proxy hash value is generated by using a second hash function, which as further described below is also used by the second hash generator 115. The proxy key is a proxy replacement for its associated search key in the hash table. In some embodiments, the proxy key is smaller than its associated search key.

When the proxy hash table 105 receives the address from the address generator 110, the table 105 outputs a proxy key and a data tuple that it stores at the received address, if it stores such a key and data tuple. When the table 105 does not stores a proxy key and data tuple at the received address location, the table outputs default proxy and data tuple values that it stores at the address location in some embodiments, while outputting a storage MISS value in other embodiments to indicate that it does not store the proxy key and data tuple at the received address.

The comparator 120 receives the output of the proxy hash table 105. The comparator also receives the output of the second hash generator 115. This hash generator 115 applies the second hash function to the received search key to produce a second hash value that it supplies to the comparator 120. When the hash table 105 outputs a proxy key, the comparator compares this proxy key with the second hash value generated by the hash generator 115. If these two values match, the comparator outputs to the data compute node 150 the data tuple that the proxy hash table output along with the proxy key. In some embodiments, the comparator outputs the data tuple to another data compute node (i.e., a different data compute node than the one that produced the search key) when the proxy and second hash values match. When these two values do not match, the comparator outputs a storage MISS value to the data compute node 150 or another compute node, in order to indicate that the proxy hash table 105 does not store a data tuple for the supplied search key. In some embodiments, the comparator provides its output (e.g., to the data compute node 150) through the input/output interface (not shown) of the data storage 100.

For the comparator to determine that the retrieved proxy key matches the hash value generated by the hash generator 115, these two values must be identical in some embodiments. In other embodiments, the comparator 120 determines that the retrieved proxy key and generated hash value match when they have a particular relationship with each other (e.g., one is an inverted version of the other, or one is a transformed version of the other). Also, in some embodiments where the proxy hash table 105 outputs a MISS value when its specified address location does not contain non-default data tuple values, the comparator foregoes its comparison operation and simply outputs a MISS value when the comparator gets a storage-miss value from the proxy hash table.

Because the proxy hash table 105 stores proxy hash keys instead of their associated search keys, and because the proxy hash keys are smaller than their associated search keys in some embodiments, the size of records at addressable locations in the table 105 are smaller than they would be if the table stored the search keys in place of their hashed values. However, this reduction in the record size may come at the expense of hash collisions. Specifically, in some embodiments, a hash function can produce the same hash value for two different search keys. Accordingly, in some embodiments, the data storage and retrieval method of the data storage 100 in some cases might result in two different search keys retrieving the same data tuple from one addressed location in the proxy hash table 105.

Figure 2:
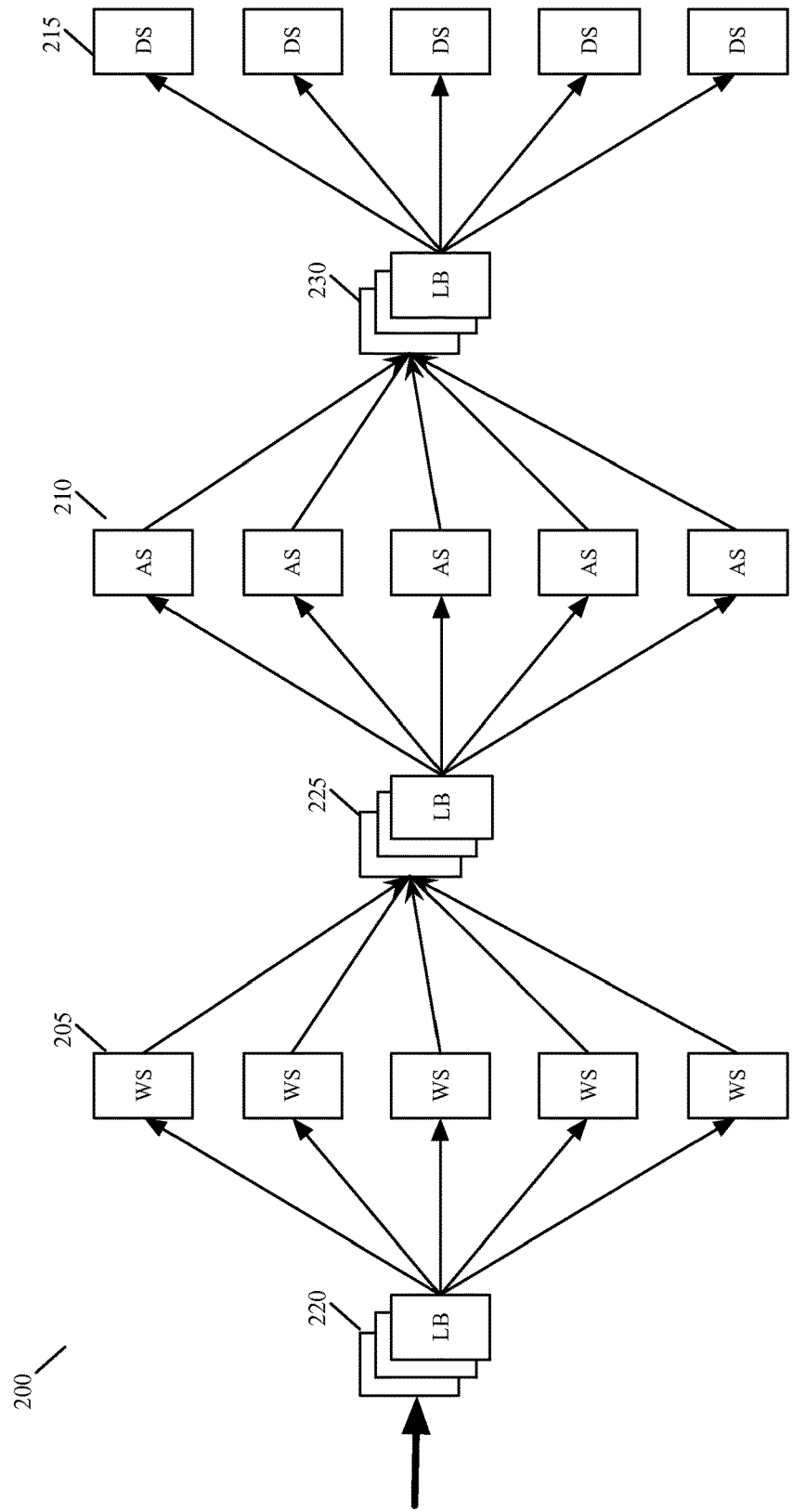
FIG. 2 illustrates an example of using load balancers in a datacenter that has multiple layers of compute nodes.

Because of this, the data compute node 150 has to be tolerant of hash collisions. In some embodiments, the hash-collision tolerant node is a load balancer that distributes a data message that is addressed to any one of several destination compute nodes, to one of those nodes based on the data tuple that is retrieved from the hash-addressed memory. FIG. 2 illustrates an example of using load balancers in a datacenter 200 that has multiple layers of compute nodes. In this example, three layers of compute nodes are shown. These three layers are webservers 205, application servers 210, and database servers 215.

As shown FIG. 2, load balancers are deployed between each of these layers and before the webservers 205. The job of these load balancers is to spread the traffic that is sent to one server group, amongst the members of that group. Accordingly, the first layer load balancers 220 spread the traffic sent to the webservers amongst the webservers 205, the second layer load balancers 225 spread the traffic sent to the application servers amongst the application servers 210, and the third layer load balancers 230 spread the traffic sent to the database servers amongst the database servers 215.

In some embodiments, when a data packet is sent to a group of candidate compute nodes, the data packet includes the virtual address for the group. In these embodiments, the load balancer distributes data packets that are addressed to a virtual address that is associated with a group of destination compute nodes (e.g., a group of webservers, application servers, or database servers), to different network addresses of the different destination compute nodes (DCNs) in that group. In this document, the term "packet" is used to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

In some embodiments, the virtual address for the DCN group is a virtual IP (VIP) address, while the network addresses of the DCNs are destination IP (DIP) addresses. Accordingly, in some embodiments, the load balancer distributes data packets that are addressed to a virtual IP (VIP) address that is associated with a DCN group (e.g., a group of webservers, application servers, or database servers), to different destination IP addresses (DIPs) of the different DCNs. In some of these embodiments, the load balancer uses a hash of the five-tuple header values (i.e., the source IP address, destination IP address, source port, destination port, and protocol) of a data packet as the search key to retrieve from the hash-addressed memory a data tuple, which, in turn, allows the load balancer to identify a DIP for the data packet.

Load balancing in some embodiments inherently involves spreading the data messages based on a set of heuristic computations that are meant to evenly spread traffic amongst a number of candidate destination compute nodes. Accordingly, the load balancer's operations are not that negatively affected by two different five tuple values hashing to the same value, and retrieving the same data tuple from the proxy hash table, as such a collision can be viewed as being part of the heuristic computation set of the load balancer.

In different embodiments, the load balancers retrieve different types of data tuples from the hash-addressed memory. In some embodiments, the retrieved data tuples are DIPs to which the VIPs map. In other embodiments, the retrieved data tuples identify different storage structures (e.g., different tables) from which the load balancer has to retrieve the DIPs for the VIPs. For instance, in some embodiments, the retrieved data tuples are version numbers that identify different destination network address translation (DNAT) tables from which the load balancer should retrieve the DIPs for the VIPs specified in the received data packets.

Each time a DCN is added (e.g., instantiated or allocated) to the group, and its DIP should be used, the load balancer of some embodiments creates a new DNAT table to store all the available DIPs for the new flows that it receives. Also, in some embodiments, each time a DCN is removed (e.g., fails or is shut off) from the group, and its DIP should no longer be used, the load balancer of some embodiments creates a new DNAT table to store the available DIPs for the new flows that it receives. Other embodiments do not create a new DNAT table when a DCN is removed from the group of DCNs. For instance, in some embodiments, each DNAT table is a resilient table that upon removal of one of the DIPs that is identified by its records, directs packet flows that map to the removed DIP to one of the live DIPs that is identified by another one of its records. In some embodiments, each DNAT table stores a pseudo-random distribution of the DIPs that were available at the creation of the DNAT table. A pseudo-random distribution of DIPs in a DNAT table in some embodiments entails distributing the DIPs that are available at the time of the creation of the DNAT table across the table's addressable locations.

Even after a new DNAT table version is created, the load balancer of some embodiments continues to process all prior flows that were being processed (i.e., load balanced) by previously created DNAT tables, by using one of the previously created DNAT tables. In other words, some embodiments create a new version of the DNAT table each time a DCN is added in order to allow newly received flows to use the new DNAT table, while allowing the older flows that are being processed to use prior DNAT table versions. Also, each time a DCN fails or is intentionally removed, some embodiments create a new version of the DNAT table for newly received flows and for older flows that were being directed to the removed DCN while using prior DNAT table versions for older flows so long as these older flows are not being directed to the removed DCN.

Figure 3:
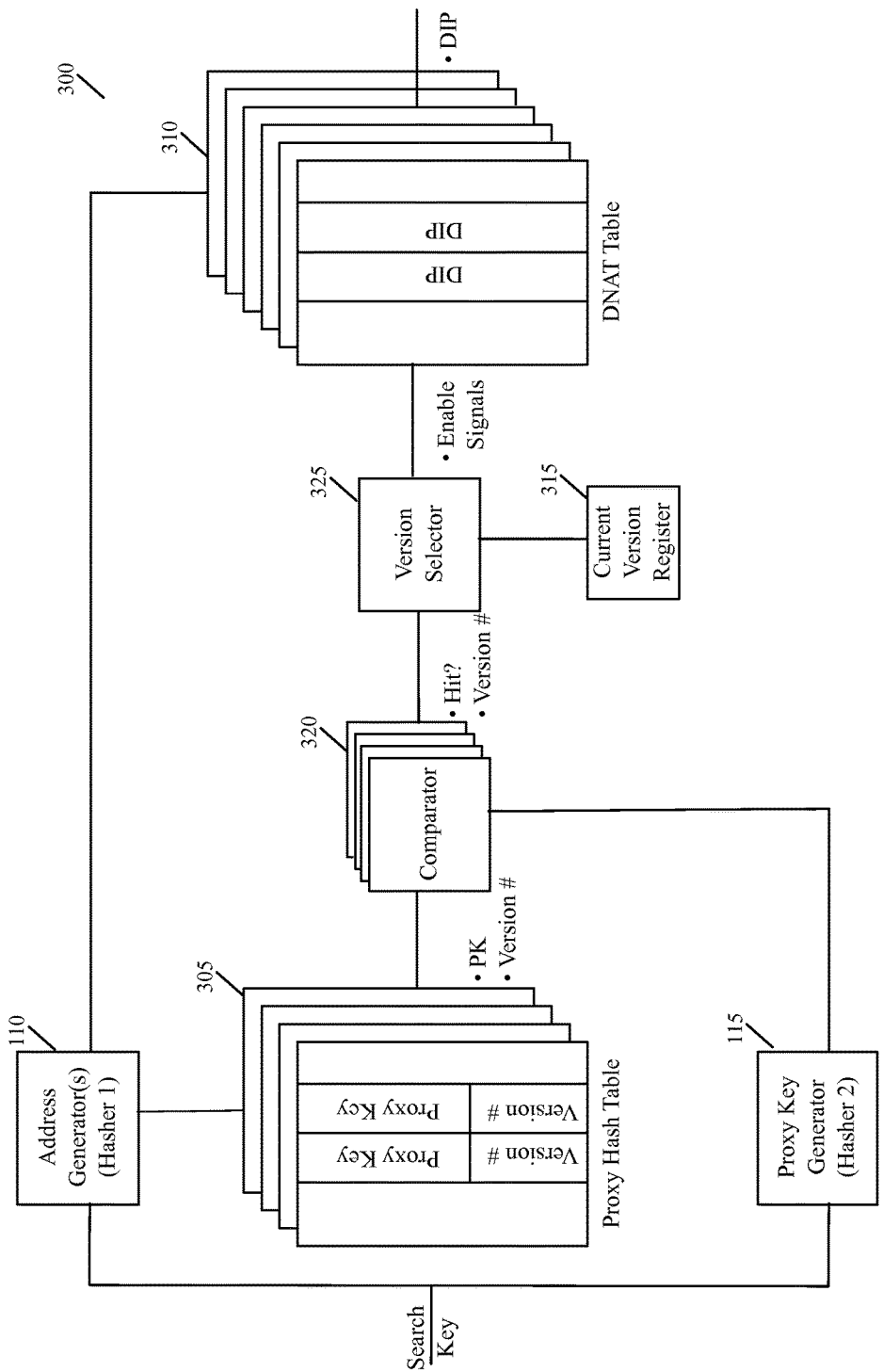
FIG. 3 illustrates an example of a connection data storage that uses a DNAT table versioning approach and the proxy hash table approach of some embodiments of the invention.

FIG. 3 illustrates an example of a connection data storage 300 that uses the above-described DNAT table versioning approach, along with the above-described proxy hash table approach of some embodiments. In some embodiments, the connection data storage 300 is part of the data plane of a load balancer. One example of such a load balancer will be further described below by reference to FIG. 7.

The connection data storage 300 provides a DIP to replace a VIP that is stored in a received data packet. This connection data storage 300 is similar to the data storage 100 of FIG. 1, as it uses two types of hash generators 110 and 115 and a proxy hash table 305. However, in FIG. 3, the proxy hash table is a four-way proxy hash table 305, with 4 sub-tables that can concurrently be accessed by one search key. The connection data storage 300 also includes a version selector 325, several (e.g., 16) DNAT table versions 310, and a current version register 315. One of ordinary skill will realize that in other embodiments, the connection data storage has different number of sub-tables in the proxy hash table, and/or different number of comparators and/or DNAT tables.

For one search key, the proxy hash table 305 of some embodiments outputs four sets of proxy key and data tuples, with the data tuple of each set providing a version number. The proxy hash table 305 outputs the four sets of values (i.e., proxy keys and associated data tuples) from the address locations identified by the address value generated by the hash generator 110 from the search key. The search key in some embodiments is the five-tuple header value (i.e., source IP, destination IP, source port, destination port, and protocol) of a received data packet. In some embodiments, the hash generator 110 generates the same address value for each of the sub-tables in the proxy hash table. In other embodiments, the hash generator 110 generates four different address values for the four sub-tables. In some of these embodiments, the hash generator 110 includes four different hash sub-generators, one for each sub-table 305.

Each comparator 320 compares a different one of the four proxy keys output by the proxy hash table with the second hash value that is generated from the search key (i.e., from the data packet's five tuples) by the hash generator 115. When one of the output proxy keys matches the second hash value, the comparator that matched the two values, outputs to the version selector the version number associated with the matched proxy key (i.e., the version number that was output from a proxy hash sub-table with the proxy key that matched the second hash value). In this case, the comparator also outputs a HIT value to the version selector to indicate that it was able to find a matching record. On the other hand, when no output proxy key matches the second hash value, the comparator outputs a MISS value to the version selector.

When the version selector receives a MISS value from all the comparators, the version selector uses a Current Version value that is stored in the current version register 315 as the version number. On the other hand, when the version selector receives a HIT value from one of the comparators, the version selector 325 uses the version value that it receives from that comparator 320, to define the current version number. Based on the version number that the version selector identifies, the version selector outputs one enable signal and several disable signals to the DNAT tables 310.

As shown in FIG. 3, the DNAT tables 310 also receives an address value that the hash generator 110 generates from the search key, which, as mentioned above, is the five-tuple header value of the data packet. In some embodiments, this address value is the same as the address value that the hash generator 110 supplies to the proxy hash sub-tables 305, while in other embodiments this address value is different than the address value(s) supplied to the proxy hash sub-table 305. Also, in some embodiments, the hash generator 110 supplies each DNAT table 310 with the same address value, while in other embodiments, this generator supplies different address values to different DNAT tables 310.

The DNAT tables 310 that receive a disable signal from the version selector do not perform any action based on the address value that they receive from the hash generator. However, the DNAT table that receives an enable signal from the version selector, outputs a DIP value from its record that is stored at the address that the table receives from the hash generator 110. Accordingly, when the proxy hash table specifies a DNAT table version number for a received data packet's five-tuple value, the connection storage 300 outputs the DIP from that DNAT table version at the address derived from the data packet's five-tuple value.

Moreover, even when the proxy hash table does not store a DNAT table version for the data packet's five-tuple value, the connection storage 300 can output at the datapath rate a DIP value (to replace the data packet's VIP value) from the DNAT table that is the current version. However, in this situation (i.e., when the proxy hash sub-tables all output MISS values), the version selector directs an external process (e.g., a process that is executed by the load balancer's CPU or an external device's CPU) to create a record in one of the proxy hash sub-tables for the data message's flow (i.e., for the data message's five-tuple) to identify the Current Version value in the current version register 315 as the version number for this flow.

Figure 4:
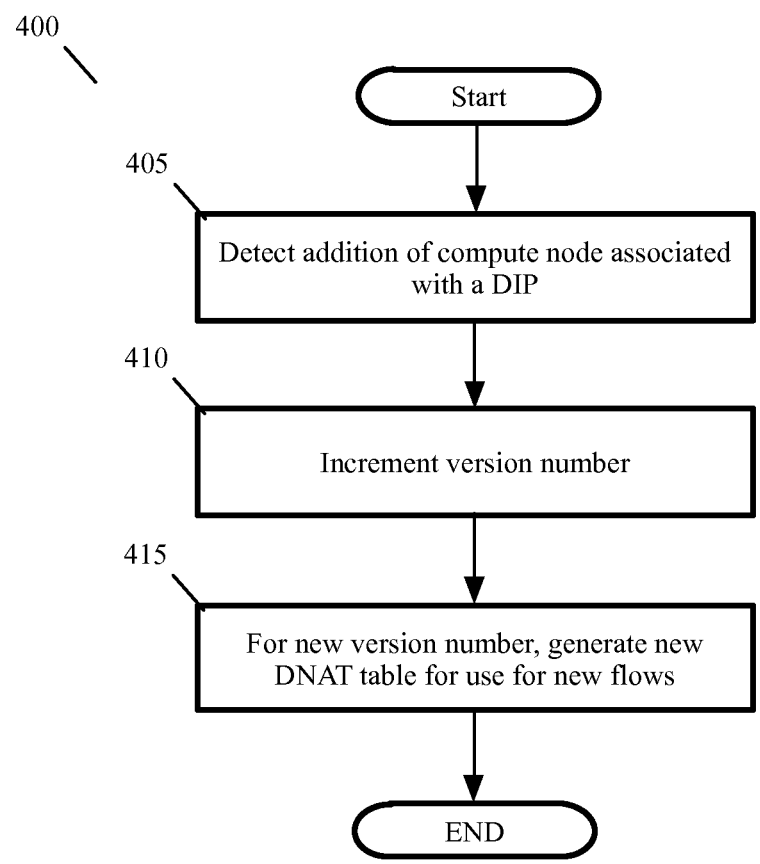
FIG. 4 illustrates a process that a load balancer of some embodiments performs when a compute node associated with a VIP is added.
Figure 5:
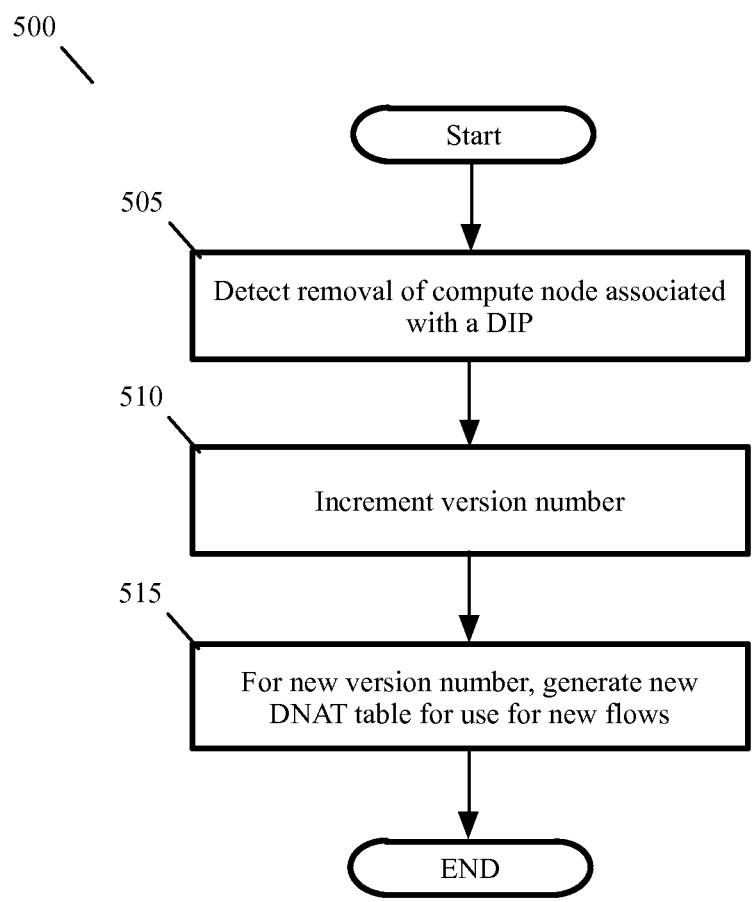
FIG. 5 illustrates a process that a load balancer of some embodiments performs when a compute node associated with a VIP is removed.

The operation of a load balancer that uses the connection data storage 300 of FIG. 3 will now be further described by reference to FIGS. 4-6. FIG. 4 illustrates a process 400 that the load balancer performs when a compute node associated with a VIP is added. As shown, the process starts when it detects (at 405) that a destination compute node (DCN) has been added to a group of DCNs that are subject to the load balancing. In some embodiments, the process is performed immediately after the DCN is added, while in other embodiments, the process is performed a time delay after the DCN is added.

Next, at 410, the process increments the DNAT table version number in the current version register 315. The process then generates (at 415) a new DNAT table for the new version number. This DNAT table will be used by all new flows that the load balancer starts to process after the creation of this table and before the creation of another DNAT table. This DNAT table includes numerous records at numerous address locations. These records specify the DIPs of the DCNs that are available at the time of the table's creation to receive data packets that are sent to the DCN group. As mentioned above, the DIPs are allocated across the table's addressable locations in a pseudo random way in some embodiments. As further described below, the new DNAT table is created by the load balancer's control plane software that one or more processing units (e.g., one or more CPUs or CPU cores) of the load balancer execute. After 415, the process 400 ends.

When a DCN is removed from a DCN group, the load balancer of some embodiments does not create a new DNAT table. In these embodiments, the flows that were being directed to an inactive DIP (to a removed DCN), get mapped to an active DIP by the resilient DNAT table that handles the flow. Resilient DNAT tables are further described below.

In other embodiments, however, the load balancer creates a new DNAT table when the DCN is removed from the DCN group. FIG. 5 illustrates a process 500 that the load balancer uses in some embodiments when a DCN should be removed from the DCN group that is subject to the load balancing. As shown, the process starts when it detects (at 505) that a DCN has failed, or has been intentionally removed (e.g., at the request of a system administrator) from the DCN group.

Next, at 510, the process increments the DNAT table version number in the current version register 315. The process then generates (at 515) a new DNAT table for the new version number. This DNAT table will be used by all new flows that the load balancer starts to process after the creation of this table and before the creation of another DNAT table. This DNAT table includes numerous records at numerous address locations. These records specify the DIPs of the DCNs that are available at the time of the table's creation to receive data packets that are sent to the DCN group. As mentioned above, the DIPs are allocated across the table's addressable locations in a pseudo random way in some embodiments.

In some embodiments, the newly created DNAT table will also be used to process any flow that the load balancer was previously routing to the removed DIP. In other embodiments, the newly created DNAT table will not be used to process old flows that were previously directed to the removed DIP. This is because in these embodiments each DNAT table is a resilient table that upon removal of one of the DIPs that is identified in its records, directs flows that map to removed DIP (i.e., dead DIP) to one of the functioning DIPs (i.e., live DIPs) that is identified by another one of its records.

Different embodiments use different types of resilient DNAT tables. In some embodiments, the DNAT table distribute the flows that were directed to a removed DIP (i.e., a failed DIP or an intentionally removed DIP) to the DIP that is identified in DNAT table location that is next or previous the dead DIP's DNAT location. However, this approach might cause the next or previous DIP to be overloaded with too many flows. Accordingly, other embodiments use a round robin scheme to distribute flows that were going to a dead DIP to a live DIP in a group of live DIPs according to a round robin order. In this manner, two different flows that were going to a dead DIP can get distributed to two different live DIPs. In other embodiments, the DNAT table uses other schemes (e.g., a deterministic, pseudo-random scheme) to distribute the flows that are mapping to a dead DIP that is identified in the table to several different DIPs that are identified in the table.

Different embodiments also use different schemes to specify whether a DIP has been removed. For instance, in some embodiments, each DIP's record in the DNAT table has one value (e.g., one bit) that specifies whether that DIP is functioning or whether it has been removed. In other embodiments, the connection data storage 300 has another storage structure (e.g., another table) that specifies whether the DIPs that are identified in a DNAT table are alive or dead. This other table can be first accessed based on an address generated by the hash generator 110, in order to determine whether the DIP that is identified in the DNAT table is alive or dead. When the DIP is determined to be alive based on this lookup, DIP's identity is retrieved from the DNAT table that is identified by the version selector. On the other hand, when the DIP is determined to be dead, the resiliency scheme of the identified DNAT table (i.e., the DNAT table identified by the version selector) is used to identify a new DIP for a flow that maps to the dead DIP.

After 515, the process 500 ends.

Figure 6:
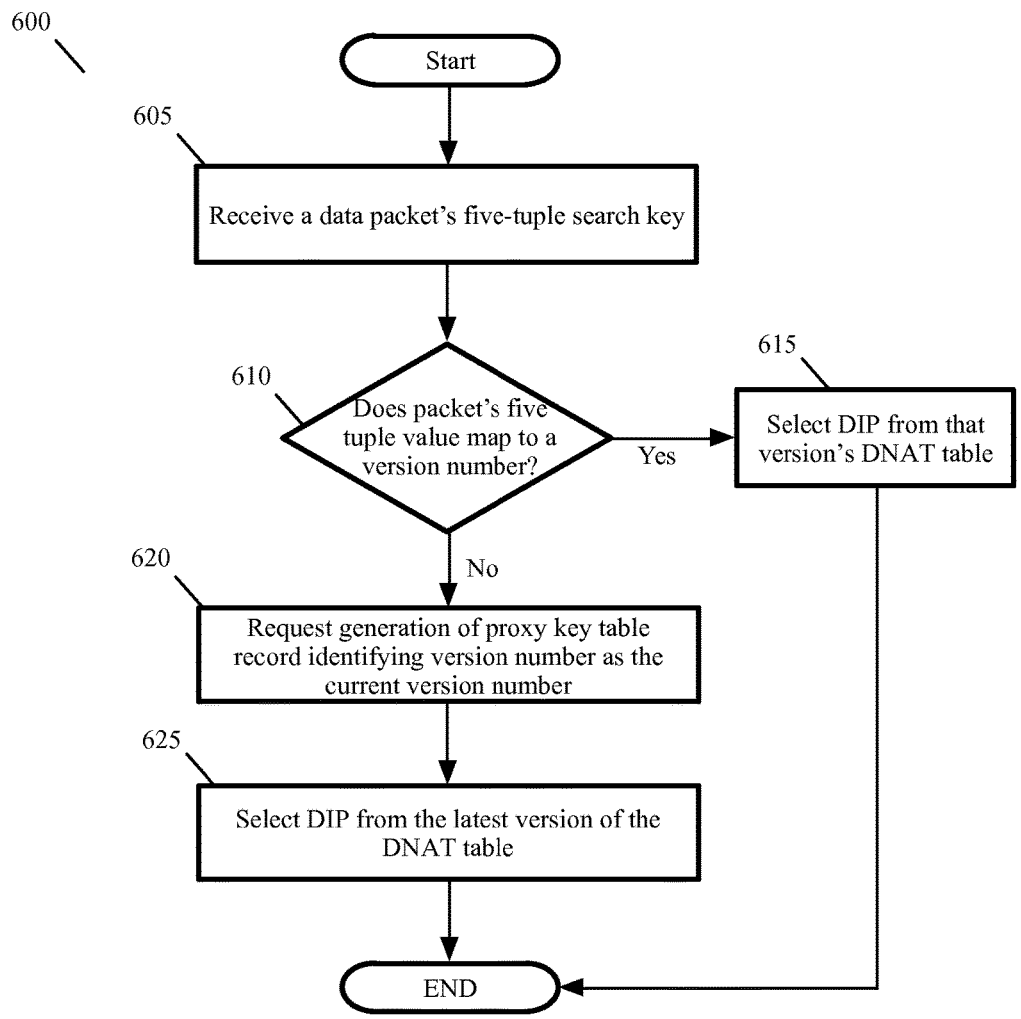
FIG. 6 illustrates a process that the connection data storage of some embodiments performs each time that it receives a search key.

FIG. 6 illustrates a process 600 that the connection data storage 300 performs in some embodiments each time that it receives a search key. As shown, the process 600 starts (at 605) when it receives a data packet's five-tuple value. This value is used to generate addresses in the proxy hash and DNAT tables 305 and 310, and to generate a hash value to compare to the retrieve proxy keys in the proxy hash table 305. One of ordinary skill will realize that in other embodiments, the process uses other attributes of the data packet as the search key.

At 610, the process determines whether one of the proxy hash sub-tables 305 stores a version number for the data packet's five-tuple value. As mentioned above, this determination is made by the comparators 320, which compare the second hash of the received five-tuple value (that is generated by the hash generator 115) with the proxy keys that are output by proxy hash table 305. This table 305 outputs the proxy keys from its address locations that are identified by the first hash of the five-tuple value that is computed by the hash generator 110.

If the process determines (at 610) that one of the proxy hash sub-tables stores a proxy hash key that matches the data packet's attributes, and thereby stores a version number for the data packet, the process then selects (at 615) a DIP from the DNAT table associated with this version number. As mentioned above, this operation entails the comparator enabling this DNAT table to output the content that it stores at an address that is identified by a hash (generated by the hash generator 110) of the data packet's five-tuple value. The outputted DIP can then be used to replace the VIP in the data packet. After 615, the process ends.

When the process determines (at 610) that no proxy hash sub-table stores a proxy hash key that matches the data packet's attributes (i.e., stores a version number for the data packet), the process then requests (at 620) that a record be created in a proxy hash sub-table to identify the current version number as the version number for the data packet's flow (i.e., for the data packet's five-tuple value). For the data packet, the process also selects (at 625) a DIP from the DNAT table that is designated as the current version (i.e., as the latest version) at an address specified by a hash that the hash generator 110 produces from the packet's attributes (which in some embodiments is the packet's five tuple). As mentioned above, this operation involves the comparator directing the latest DNAT table version to output the DIP record that it stores at an address that is identified by a hash (generated by the hash generator 110) of the data packet's five-tuple value. After 625, the process ends.

Figure 7:
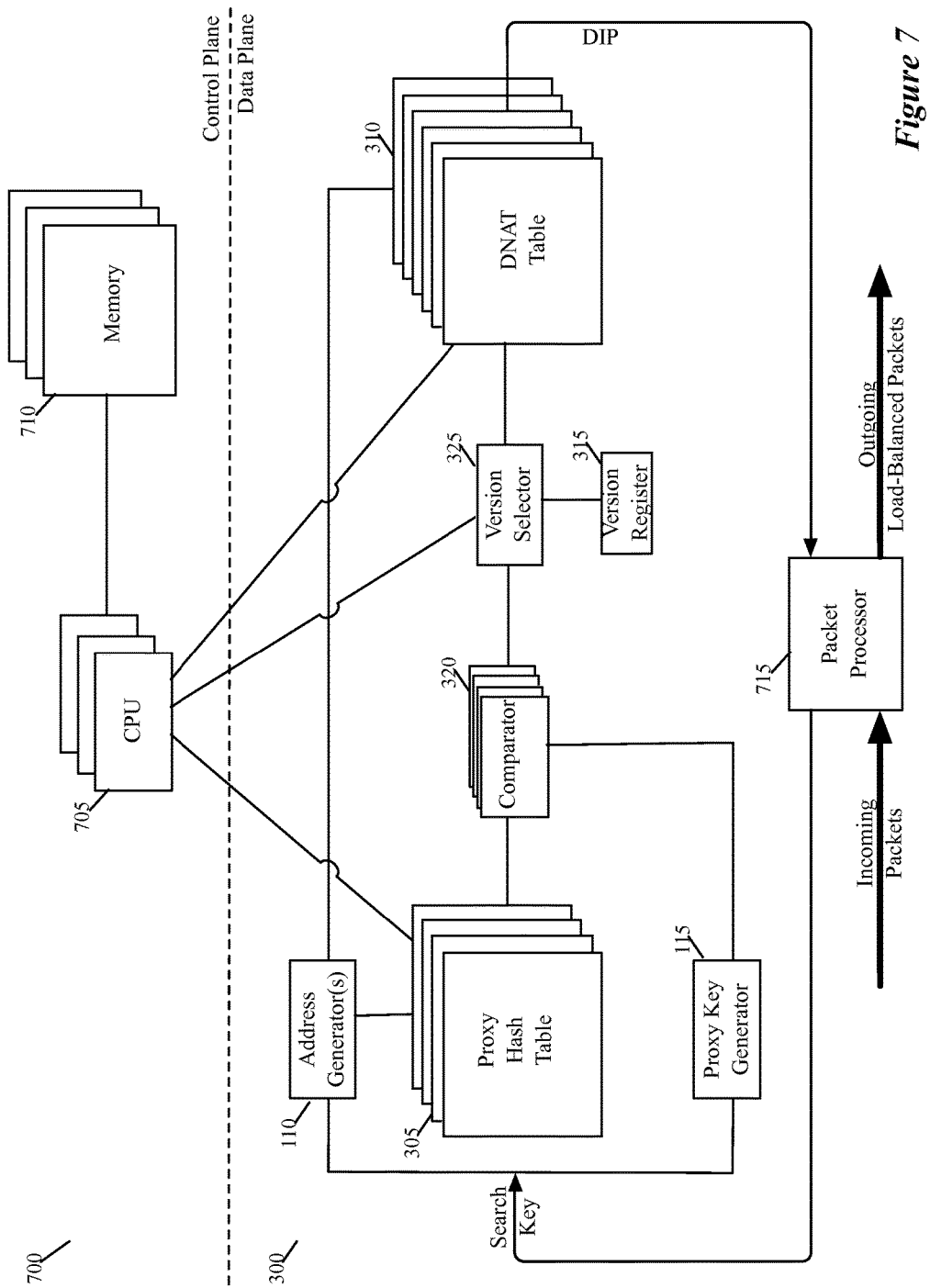
FIG. 7 presents a conceptual illustration of a load balancer of some embodiments.

FIG. 7 presents a conceptual illustration of a load balancer 700 of some embodiments. As shown, this load balancer 700 includes the connection data storage 300 of FIG. 3. This data storage is part of the load balancer's data plane circuits, which also includes a packet processor 715. The packet processor receives incoming packets that are directed to one or more VIPs of one or more DCN groups. The packet processor 715 extracts each packet's five tuples, and supplies the extracted tuples to the connection data storage as a search key. From the connection data storage, the packet processor then receives a DIP address to replace the VIP address in the packet. Once the packet processor replaces the VIP address with the DIP address in the packet, it outputs the packet through the load balancer's network interface (not shown).

As shown in FIG. 7, the load balancer 700 also has a control plane that includes the modules that are not for directly processing the data packets received in the load balancer's datapath. The control plane includes one or more central processing units (CPUs) 705 and one or more memories 710. One or more control-plane processes are stored in one or more memories 710, and execute on one or more CPUs or CPU cores 705.

The control plane provides the interface to configure the load balancer. It also includes one or more CPUs and memories that perform control plane functionalities that are needed to configure the data plane operations of the load balancer. For instance, each time the version selector receives a MISS signal from all the comparators 320 for a search key, the version selector notifies a control plane process (e.g., by writing to an address in a memory 710 or to a register of a CPU 705, or by generating an interrupt) of this miss along with the identity of the search key that resulted in this miss.

From this search key, the notified control-plane process then generates a record for the proxy hash table. This record includes a proxy hash key and a version number. The version number is the current version number that is stored in the version register 315. This version number is used because the current version's DNAT table 310 is used in the data plane to retrieve a DIP for the search key that resulted in the MISS signal. The generated record's proxy hash key is a hash value that is generated by a hash generation function that is identical to that of the proxy-key, hash generator 115. The control plane pushes the generated record to the proxy hash table 305 at an address that is generated by a hash generation function that is identical to the function used by the address hash generator 110. One process for generating and storing proxy keys in the proxy hash table will be described below by reference to FIG. 8.

A new version of a DNAT table has to be occasionally created, e.g., when a new DCN is added to a DCN group, and/or a DCN is removed from a DCN group. In such cases, a control-plane process in some embodiments generates the new version of the DNAT table by distributing the DIPs that are available at the time of the creation of the DNAT table across the table's addressable locations. In some embodiments, the distribution of the DIPs is a pseudo-random distribution of the available DIPs. The control plane process then pushes the values generated for the new version of the DNAT table to the data plane.

Figure 8:
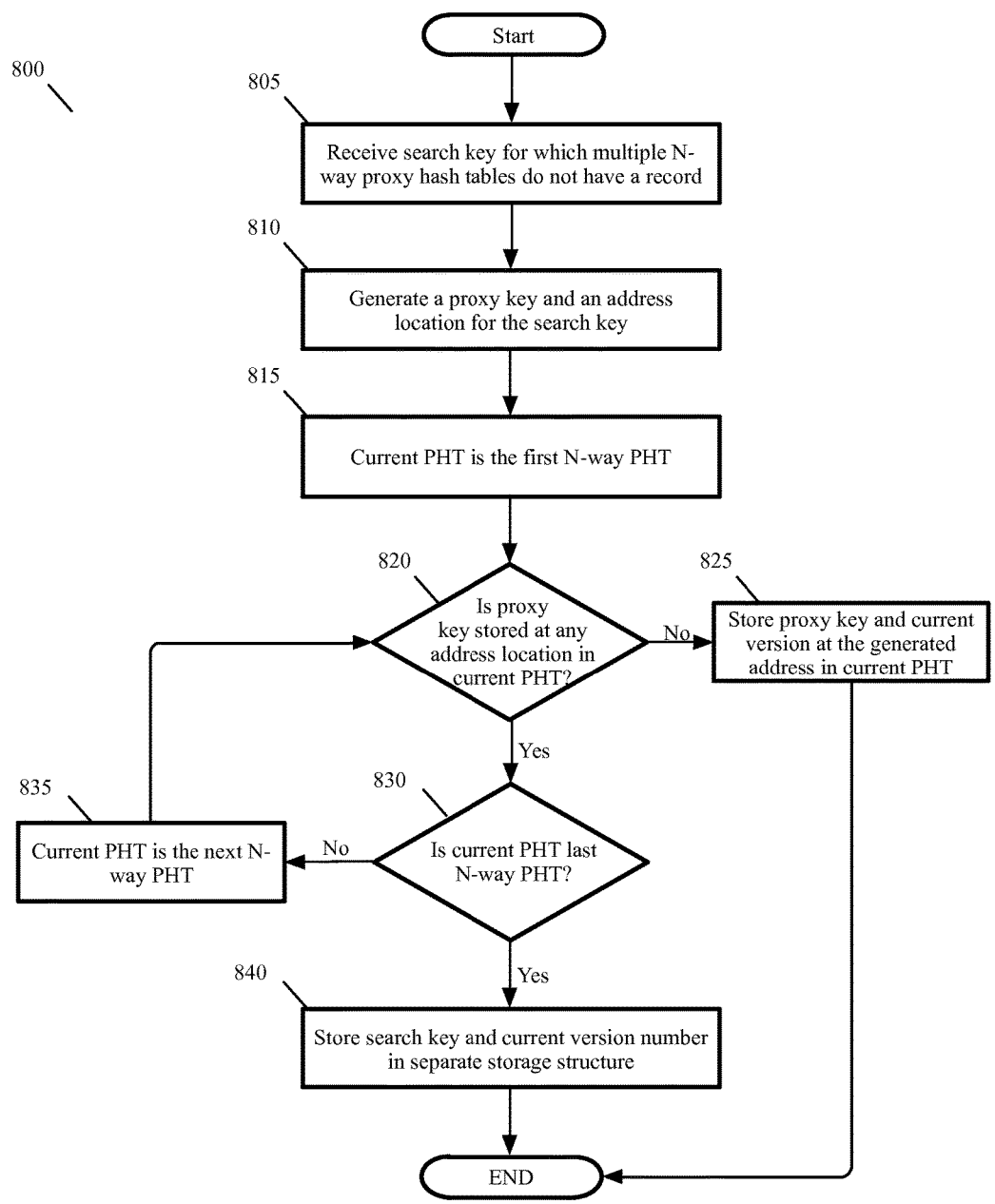
FIG. 8 illustrates a process that generates and stores records in a proxy hash table for a particular search key.

FIG. 8 illustrates a process 800 that generates and stores records in a proxy hash table for a particular search key. In some embodiments, this process is a control-plane process of a load balancer that is identical to the load balancer 700 of FIG. 7, except that the load balancer that is associated with the process 800, uses multiple N-way (e.g., 4-way) proxy hash tables. This load balancer uses multiple N-way proxy hash tables because it stores the same proxy key once at most in each N-way proxy hash table. When the same proxy key is stored two or more time in an N-way proxy hash table, a look-up into this table might result in the output of two or more records with the same proxy key but different version numbers. This is because the same search key may at some point map to two or more different records in the proxy hash table that store different version numbers. Accordingly, before storing a generated proxy key in a proxy hash table, the process 800 first checks to determine whether the proxy key is already stored at any addressable location in the proxy hash table, as further described below.

As shown in FIG. 8, the process 800 starts (at 805) when it receives a search key for which the connection data storage could not find any record in multiple N-way proxy hash tables at addresses that the hash generator 110 generates from the search key. In other words, this search key is a search key that (1) is extracted from a packet that the packet processor 715 receives, and (2) is associated with a packet flow for which the multiple N-way proxy hash tables do not have a record (with a matching proxy key at the generated addresses).

At 810, the process generates a proxy key and an address for the search key in some embodiments. The process generates the proxy key by using the same hash function as the proxy-key hash generator 115. The process also generates the address by using the same hash function as the address generator 110. In some embodiments, the generated address identifies the N-record locations in each proxy hash table. In other embodiments, the process generates (at 810) multiple different addresses for the multiple different N-way proxy hash tables and/or for the sub-tables of each proxy hash table, because the address generator 110 would generate multiple unique addresses for the different N-way proxy hash tables and/or sub-tables in the proxy hash table. Similarly, other embodiments may generate different proxy keys for the different N-way proxy hash tables.

The received search key did not map to any record in any proxy hash table that had a matching proxy key. However, this does not mean that the proxy key that is generated at 810 is not stored within any record in any proxy hash table. Accordingly, the process 800 performs the operations 815-840 to determine whether the generated proxy key is stored in any record in any proxy hash table. These operations will store the generated proxy key in the first N-way proxy hash table that does not have any record that contains the proxy key. When the process steps through the proxy hash tables (PHT) to identify a proxy hash table that does not store the generated proxy key, the process iterates through the PHTs according to a particular order.

At 815, the process defines the current proxy hash table as the first N-way PHT according to the particular order. Next, at 820, the process determines whether the current PHT stores the proxy key generated at 810. To make this determination, another process (e.g., a control-plane process of the load balancer 700) maintains in software a hash table of the proxy keys that are stored in each N-way proxy hash table in some embodiments. Accordingly, to determine (at 820) whether the current PHT stores the generated proxy key, the proxy key is hashed to identify an address in the software hash table for the current PHT, and the proxy key is then compared to the data tuple stored at the identified address to determine whether the proxy key is already stored in the PHT.

When the process 800 determines (at 820) that the proxy key is not stored in the current PHT, the process stores (at 825) the proxy key and the current version number in the current PHT at the address generated at 810, and then ends. On the other hand, when the process determines (at 820) that the proxy key is already stored in the current PHT, the process determines (at 830) whether the current PHT is the last N-way PHT of the connection data storage 300. If the current PHT is not the last PHT, the process defines (at 835) the current PHT as the next N-way PHT according to the particular order, and then returns to 820. The process transition back to 820 from 835 so that it can cycle through the PHTs in the particular order, until it can find one PHT that does not store the proxy key generated at 810.

In some cases, the generated proxy key will be stored once in each N-way PHT. Accordingly, in these cases, the process determines (at 830) that the current PHT is the last PHT. In this situation, the process 800 transitions from 830 to 840. At 840, the process stores the search key and the current version number in a separate storage structure (e.g., in an auxiliary table) that stores a small number of records for search keys that produced proxy keys that were stored multiple times for other search keys in all of the available PHTs. This separate storage structure can be small because hash collisions are rare and the frequency of multiple such collisions becomes even more rare when multiple N-way hash tables are used. After 840, the process ends.

During the packet processing, a load balancer's connection data storage that uses multiple N-way PHTs would individually check the PHTs according to the same sequential order as the process 800 uses for stepping through (at 835) the PHTs to find a PHT suitable for storing a proxy key. When the connection data storage finds a proxy key at a generated address location (i.e., an address location generated from a received search key) in one of the N-way PHTs, the connection data storage retrieves the DNAT table version number from this PHT, and then retrieves the DIP address for a DCN from the DNAT table identified by the retrieved version number.

On the other hand, when the connection data storage does not find a proxy key in any of the N-way PHTs, the data storage then checks its separate storage structure (e.g., its auxiliary table) to determine whether the received search key is stored in one of this structures records. When this structure stores the search key, the connection data storage retrieves the version number from the record with the matching search key. When this structure does not store the search key, the connection data storage generates a MISS signal that informs the version selector that no records exists for the received search key. The version selector can then use the current version DNAT table to retrieve a DIP for the packet from which the search key was extracted. The version selector can then also have the control-plan process 800 generate a record for this search key in the datapath (e.g., in one of the PHT tables or in the auxiliary separate storage structure).

Figure 9:
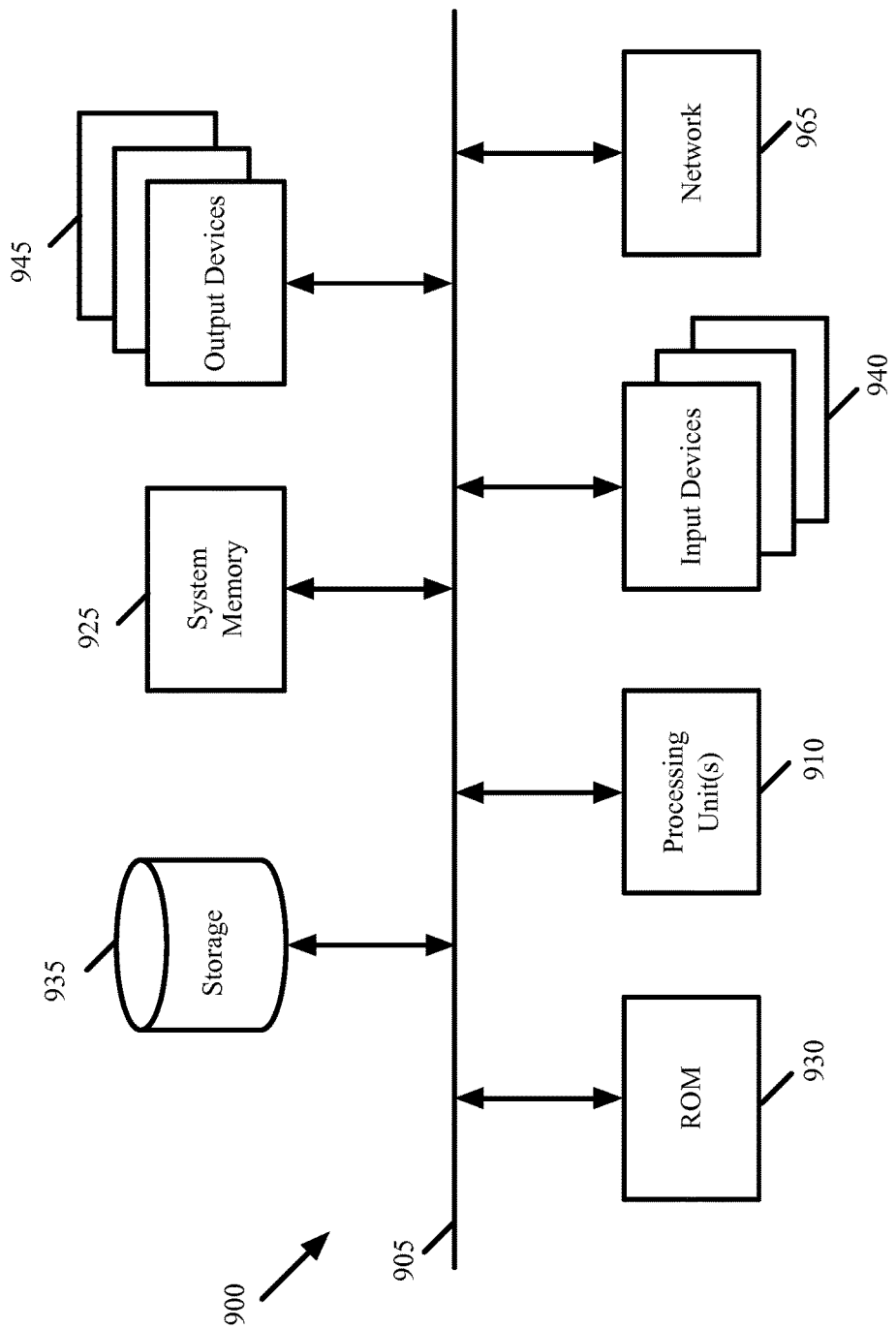
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, server computer, mainframe, a blade computer etc.), phone, PDA, or any other sort of electronic device. The electronic system 900 is also the control plane modules of the load balancer of some embodiments. As shown, the electronic system includes various types of computer readable media and interfaces for various other types of computer readable media. Specifically, the electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935. From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, a number of the figures (e.g., FIGS. 4, 5, 6, 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Therefore, one of ordinary skill in the art would understand that the invention is not to be limited by the foregoing illustrative details, but rather is to be defined by the appended claims.

What is claimed is:

1. A method of accessing a data storage, the method comprising:
using first and second hash functions to generate first and second hash values from a search key;
using the first hash value to identify N addressable locations in N sub-tables of an N-way hash table of a hash-addressed memory, wherein a third hash value and a data tuple are stored in the identified addressable location in a first sub-table of the N-way hash table that is the first according to an order of sub-tables;
determining whether the second and third hash values match;
when the second and third hash values match, outputting from the data storage the first data tuple stored in the identified addressable location of the first sub-table;
when the second and third hash values do not match, iteratively examining addressable locations identified by the first hash value in subsequent sub-tables according to the order of sub-tables to determine whether a fourth hash value stored at the addressable location of the subsequent sub-table matches the second hash value, and if so, to output a second data tuple stored at the addressable location of the subsequent sub-table.

2. The method of claim 1, wherein the first and second hash values differ as the first and second hash functions differ.

3. The method of claim 1 further comprising:
when no addressable location of the N sub-tables stores a fourth hash value that matches the second hash value, determining whether a separate storage structure stores the search key in a record of the separate storage structure; and
when the separate storage stores the search key in the record, outputting a third data tuple stored in the record.

4. The method of claim 1, wherein determining whether the second and third hash values match comprises determining whether the second and third hash values are identical.

5. The method of claim 1, wherein determining whether the second and third hash values match comprises determining whether the second hash value is an inverted version of the third hash value.

6. The method of claim 1, wherein determining whether the second and third hash values match comprises determining whether the second hash value is a transformed version of the third hash value.

7. A data storage comprising:
first and second hash generators to generate first and second hash values from a search key;
a hash-addressed memory comprising N sub-tables of an N-way hash table,
the hash-addressed memory to store a plurality of data tuples with a plurality of hash values at a plurality of locations in the N sub-tables, wherein the first hash value identifies N addressable locations in the N sub-tables of the N-way hash table;
the hash-addressed memory to output from each of the N addressable locations in the N sub-tables a hash value and a data tuple; and
a comparator to compare the second hash value and a hash value from a sub-table that is first according to an order of the sub-tables, and to output the data tuple that is stored in the first sub-table when the second hash value matches the hash value stored in the first sub-table;
when the second hash value does not match the hash value stored in the first sub-table, the comparator iteratively examining addressable locations identified by the first hash value in subsequent sub-tables according to the order of sub-tables to determine whether a hash value stored at the addressable location in the subsequent sub-table matches the second hash value, and if so, to output the data tuple stored at the addressable location with the matching hash value.

8. The data storage of claim 7, wherein the first and second hash values differ as the first and second hash functions differ.

9. The data storage of claim 7 further comprising:
a separate storage structure storing records comprising search keys and associated data tuples to be examined when no addressable location of the N sub-tables stores a hash value that matches the second hash value.

10. The data storage of claim 7, wherein the second and third hash values match when the second and third hash values are identical.

11. The data storage of claim 7, wherein the second and third hash values match when the second hash value is an inverted version of the third hash value.

12. The data storage of claim 7, wherein the second and third hash values match when the second hash value is a transformed version of the third hash value.

* * * * *